United States Patent [19]

Kunikawa et al.

[11] Patent Number: 4,647,191

[45] Date of Patent: Mar. 3, 1987

[54] METHOD OF CONTROLLING A LENS STOP POSITION

[75] Inventors: Norihide Kunikawa, Yao; Tetsuya Kondo, Shizuoka; Yasumasa Ohba, Numazu; Michihiro Matsuoka, Susuno, all of Japan

[73] Assignee: Sharp Kabushiki Kaisha, Osaka, Japan

[21] Appl. No.: 772,436

[22] Filed: Sep. 4, 1985

[30] Foreign Application Priority Data

Sep. 5, 1984 [JP] Japan ................................ 59-186210

[51] Int. Cl.4 ........................ G03B 27/34; G03B 27/40

[52] U.S. Cl. .......................................... 355/56; 355/57

[58] Field of Search ........................ 355/56, 57, 58, 59

[56] References Cited

U.S. PATENT DOCUMENTS

| | | | |
|---|---|---|---|
| 4,488,804 | 12/1984 | Takagi | 355/56 |
| 4,521,100 | 6/1985 | Yonemori et al. | 355/57 |
| 4,552,450 | 11/1985 | Tomosada et al. | 355/56 |

*Primary Examiner*—Monroe H. Hayes

*Attorney, Agent, or Firm*—Birch, Stewart, Kolasch & Birch

[57] ABSTRACT

A method of controlling the movement of a lens in a copying apparatus wherein the amount of lens movement is detected and the movement of the lens is corrected if necessary when the lens passes the home position. Even an error in the number of pulses counted before the lens passes the home position can be corrected because of the presence of the home position.

2 Claims, 9 Drawing Figures

METHOD OF CONTROLLING A LENS STOP POSITION

BACKGROUND OF THE INVENTION

The present invention relates to a method of controlling a lens stop position in an electrophotographic copying apparatus with a magnification changing function.

Generally, an electrophotographic copying apparatus having a magnification changing function, particularly, an electrophotographic copying apparatus with a stepless magnification changing function having a zoom lens mounted thereon employs a stepping motor for driving the lens. In addition, in such an electrophotographic copying apparatus as referred to above, a home position is set in the extent of the movement of the lens, and therefore, the lens is arranged to be moved centering on the home position. However, if electrical disturbances from outside such as noises, etc. are given rise to, or dust and/or toner are present in a driving part of the copying apparatus during the movement of the lens, it may happen that the lens does not stop exactly at a desired position. Moreover, the stop position may possibly be missed when a discordance phenomenon is caused, that is, toning is lost while the stepping motor is being driven.

SUMMARY OF THE INVENTION

Accordingly, an essential object of the present invention is to provide an improved method of controlling a lens stop position so that the lens can be stopped exactly at the desired position, without a loss of toning, even when it becomes necessary to correct the moving amount of the lens for some reason after it is checked at a home position during the movement of the lens.

In accomplishing this and other objects of the present invention, there is provided an improved method of controlling a lens stop position, whereby, an initial control pattern for the movement of the lens to a desired position is set, then when it is detected by a sensor that the lens has passed a home position, the moving amount of the lens is detected, and at the same time, if the moving amount of the lens is to be corrected, it is detected whether the moving condition of the lens at the home position is in an accelerating or decelerating condition or a constant speed condition. When it is detected that the moving condition is the accelerating or decelerating condition, the lens movement is not corrected until it is brought into the constant speed condition or until the speed of the lens becomes controllable. When the lens position is to be corrected and it is detected that the moving condition of the lens is the constant speed condition, the control pattern for the movement of the lens is corrected so that the lens will be moved to the desired position.

By constructing the electrophotographic copying apparatus in the manner as described above, according to the present invention, it is so arranged that the moving amount of the lens is detected to determine whether correction is needed when the lens has passed the home position, thus when there is an error in the number of pulses counted before the lens has passed the home position, the error can be corrected because of the presence of the home position. Furthermore, when an error is found after the moving amount of the lens is detected, it is detected whether the moving condition of the lens at the home position, in accordance with a control pattern to be corrected after the moving amount of the lens is detected or the present moving condition of the lens is an accelerating or decelerating condition or a constant speed condition. If it is detected that the moving condition of the lens is the accelerating or decelerating condition, the lens is controlled to be moved in accordance with an initially-set pattern till the speed of the lens is reduced to a controllable constant speed, at which point the lens position is corrected by the amount obtained as a result of the proofreading. Therefore, according to the control method of a lens stop position of the present invention, since there is no abrupt change in the moving speed of the lens at the home position, a loss of toning can be prevent. Moreover, the control method of the present invention is advantageous in that the movement of the lens after it has passed the home position is made smooth, and the lens can be stopped exactly at a desired position.

BRIEF DESCRIPTION OF THE DRAWINGS

This and other objects and features of the present invention will become apparent from the following description taken in conjunction with preferred embodiments thereof with reference to the accompanying drawings, throughout which like parts are designated by like reference numerals and, in which.

DESCRIPTION OF THE EMBODIMENT

Figure 2:
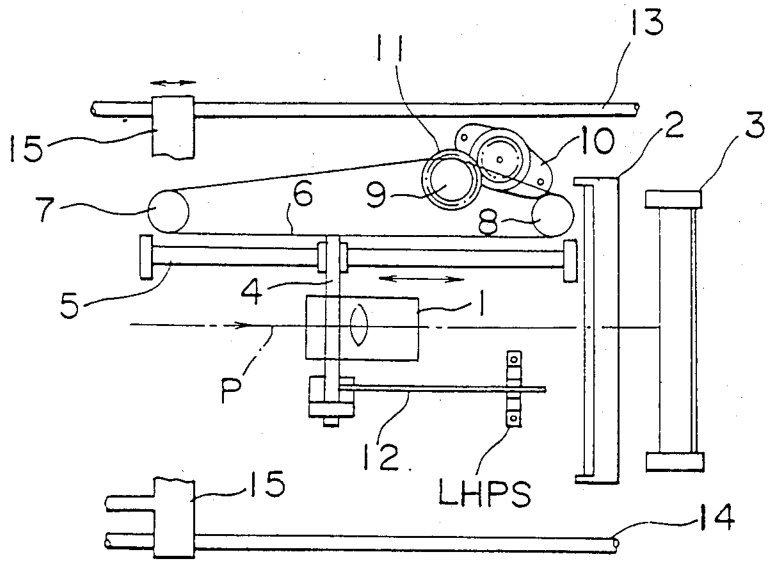
FIG. 2 is a schematic plan view of a driving part of a zoom lens in an electrophotographic copying apparatus to which the control method of FIG. 1 is practiced.

Referring now to the drawings, there is shown in FIG. 2 a schematic plan view of a driving part of a zoom lens employed in an electrophotographic copying apparatus, to which a method of controlling a lens stop position according to the present invention is practiced.

In FIG. 2, a light reflected from an original document which is illuminated by a light source (not shown) is injected into a lens unit 1 along a light axis P to be reflected by a fixed mirror 3 through an optical plate 2 having a notched portion formed therein for passing the light. Thereafter, the light is introduced into a photosensitive drum (not shown). The lens unit 1 is secured to an arm member 4 standing at right angles with respect to the light axis P. One end of the arm member 4 is not only slidably supported by a shaft 5 which is placed in horizontal relation with respect to the light axis P, but also secured to a part of a wire 6. The wire 6 is extended between pulleys 7 and 8 through a pulley 9. Pulley 9 is coupled to a speed reduction gear 11 for a lens motor 10 which is a stepping motor. Meanwhile, the other end of the arm member 4 is secured to an end portion of a light shield plate 12 extending in parallel to the light axis P towards the fixed mirror 3. A home position sensor LHPS is provided in an elongated direction of the light shield plate 12, which is constructed of an optical sensor comprising a light receiving element having a recess portion therein for passing the light shield plate 12 therethrough and a light emitting element. The home position sensor LHPS is turned on when the light plate 12 is positioned in the recess portion. A home position of the lens is the position where the sensor HLPS is turned from on to off. It is to be noted that there are two shafts 13 and 14 in parallel to the light axis P at opposite sides of the apparatus body. The opposite end portions of a mirror base 15 are respectively slidably supported by these shafts 13 and 14. The mirror base 15 secures a mirror receiving a reflected light from the original document, and reciprocally moves along the shafts 13 and 14 together with the other mirror base securing the light source (not shown), during the scanning time of the original document.

Figure 3:
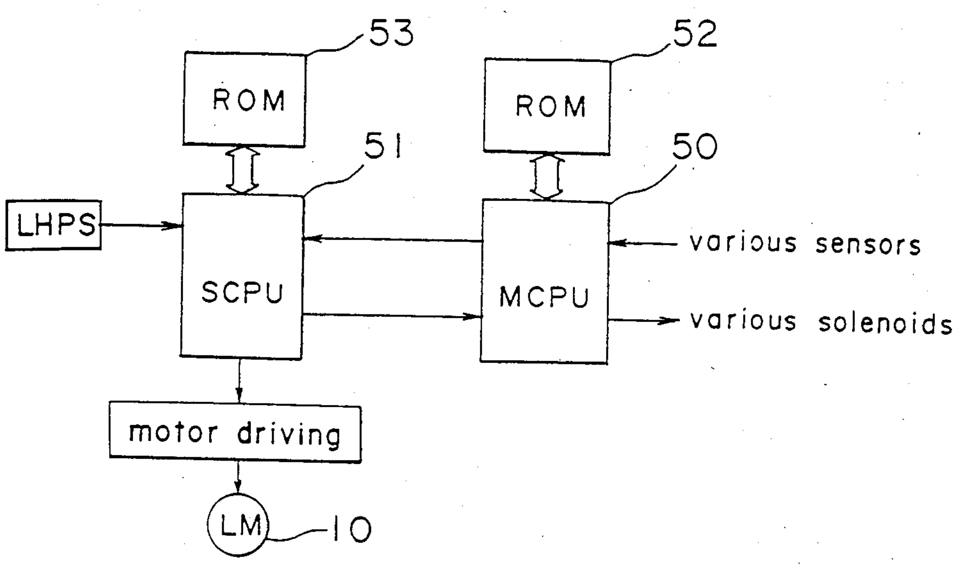
FIG. 3 is a schematic block diagram of a controlling part of the electrophotographic copying apparatus.

FIG. 3 is a schematic block diagram of a controlling part of the copying apparatus. The controlling part of the electrophotographic copying apparatus according to the present invention is constructed of a master CPU (MCPU) 50 and a slave CPU (SCPU) 51. The MCPU 50 sends a lens initial command or a lens moving command to the SCPU 51, while the SCPU 51 sends a status, etc. to the MCPU 50. The MCPU 50, after receiving a signal from an input key, various sensors or the like, sends a command to the SCPU 51 in accordance with a program preliminarily stored in a ROM 52, receives a status from the SCPU 51, and controls various solenoids and a main motor. On the other hand, the SCPU 51, after receiving a command sent out from the MCPU 50, receives a signal from the home position sensor LHPS in accordance with a program preliminarily stored in a ROM 53, and sends a driving pulse to the lens motor 10. After carrying out a given operation, the SCPU 51 sends out a status or the like to the MCPU 50.

Figure 4:
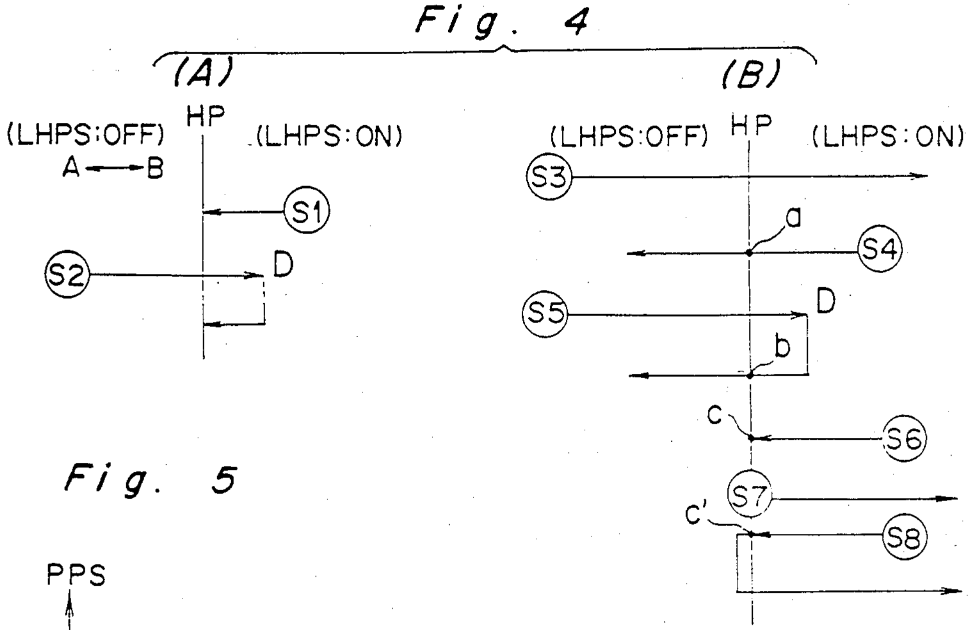
FIGS. 4(A) and (B) are diagrams showing a pattern of the movement of the lens when a lens initial command is received, and a pattern controlling the movement of the lens when a lens moving command is received, respectively.

FIG. 4(A) shows a pattern of the movement of the lens when the SCPU 51 receives a lens initial command. With a home position HP as a center, the right side is an area in which the sensor LHPS is in an on-state, while the left side is an area in which the sensor LHPS is in an off-state. In other words, referring to FIG. 2, the range in which the light shield plate 12 is the recess portion of the sensor LHPS is the area at the right side of the home position HP, and the range in which the light shield plate 12 is not in the recess portion of the sensor LHPS is the area at the left side of the home position HP. Referring back to FIG. 4(A), when the initial position is S1, the SCPU 51 determines the direction of movement of the lens to the home position HP to be that shown by an arrow A, and sets the moving amount of the lens as the distance from the initial position S1 to the home position HP. Accordingly, the lens is moved from the initial position S1 to the home position HP where it is stopped. When the inital position is S2, the direction of the movement of the lens is first set to be as shown by an arrow B, then to be as shown by the arrow A, with the moving amount of the lens being set to be the sum of the distance from the initial position S2 to a D point and that from the D point to the home position HP. As a result, the lens is first moved from the initial position S2 to the D point at the right side of the home position HP, and then it is moved in the direction of the arrow A to be stopped at the home position HP. According to the present embodiment, when the lens initial command is received from the MCPU 50, it is so arranged that the approach to the home position HP is always performed in the direction of the arrow A. The reason for this is that there is a possibility for a hysteresis to be brought about in outputs of the sensor at the home position HP if the approach to the HP is made possible in two opposite directions. Such technical approach in one direction as described above is disclosed in, for example, U.S. Pat. No. 4,412,737 (corresponding to Japanese Utility Model Application No. 55-38645).

FIG. 4(B) shows a pattern of control over the movement of the lens when the lens is to be moved to a desired position. When an initial position is S3 and the desired position is at the right side of the home position HP, the pattern of control is set to be straight to the desired position. When the initial position is S4 and the desired position is found at the left side of the home position HP, the pattern of control is set to be straight to the desired position. In this case, however, the moving amount of the lens is detected when the lens has passed the home position (a point a). Furthermore, as will be described later, if a correction of the moving amount is required after the moving amount of the lens is detected, the pattern of control is corrected. When the initial position is S5, and the desired position is found at the left side of the home position HP, the pattern of control is such that the lens is first moved to the D point at the right side of the home position HP, and then moved to the desired position. In this case also, the moving amount of the lens is detected when the lens has passed the home position HP (a point b) while moving from the D point to the desired position. When the initial position is S6, with the desired position being the home position HP, the pattern of control is set to be straight from the initial position S6 to the home position HP. The moving amount of the lens is also detected in this case when the lens has reached the home position HP (a point c). Further, when the initial position is S7, that is, the home position HP, and the desired position is found at the right side of the HP, a straight pattern from the initial position to the desired position is the control pattern. When the initial position is S8, namely, when the initial position is S8 and the desired position is at the right side of the home position HP, the control pattern is a continuation of the pattern when the initial position is S4 and the pattern when the initial position is S3. The moving amount of the lens is detected at a point C'. Thus, as described hereinabove, when the SCPU 51 receives a lens moving command, the control pattern is set in such a manner that the lens always passes the home position HP wherever the desired position is. The moving amount of the lens at the HP is detected only in the cases of those 6 shown in FIG. 4(B) where the initial position is S4, S5, S6 and S8, the reason for which is the same as in the case of FIG. 4(A) when a lens initial command is received. In other words, when the lens is moved from the left side to the right side of the home position HP (in the B direction), there is a higher possibility that a positional difference may be raised in the position of the home position HP because of the hysteresis, as compared with the case that the lens is moved from the right side to the left side of the HP (in the A direction). It is needless to say that if an influence by the hysteresis or the like is able to be removed, the detecting of the moving amount of the lens may be done at the HP even when the initial position is S3.

Figure 5:
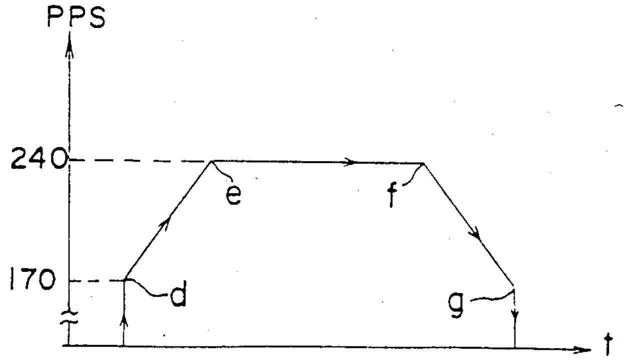
FIG. 5 is a graph showing a pattern of the rotating speed of a motor.

FIG. 5 is a graph showing the rotational characteristic of the lens motor 10. The rotating speed 170 PPS is a controllable speed generated immediately after the lens motor 10 is turned on. The greatest rotating speed is 240 PPS, which is constant. In order to produce this greatest rotating speed, a speed-up control should be carried out for the purpose of preventing a loss of toning. A line from d point to e point in the drawing represents the area of the speed-up control. When the rotating speed is changed from 240 PPS into a stop mode, a slow-down control is performed since the rotating speed is 240 PPS till it becomes 170 PPS. The area of the slow-down control is shown by a line from f point to g point in the drawing. Both the speed-up control area and the slow-down control area have a fixed inclination at all times, and the number of pulses required for their completion is always fixed. Moreover, when the rotating speed reaches 170 PPS, it can be changed immediately to zero by turning off the motor 10. Owing to the above-described rotational characteristic, the lens is moved at the rotating speed of 170 PPS in the case where the moving amount of the lens is small. On the contrary, in the case where the moving amount of the lens is relatively large, the speed-up control area between d point and e point, and the slow-down control area between f point and g point are utilized. Specifically, the lens is subjected to the speed-up control from at the rotating speed of 170 PPS, and it is subjected to the slow-down control before the rotating speed reaches 240 PPS, so as to be stopped. In the case where the moving amount of the lens is considerably large, the lens is subjected to the speed-up control from at the initial position so as to be moved at the rotating speed of 240 PPS. Subsequently, the lens is subjected to the slow-down control to reduce the rotating speed to 170 PPS, then it is stopped. Since the inclination in the change of the rotating speed is always fixed both in the speed-up control area and in the slow-down control area, whichever moving pattern the lens takes, the moving amount can be set by the number of pulses given to the stepping motor until the lens reaches the desired position.

Figure 1:
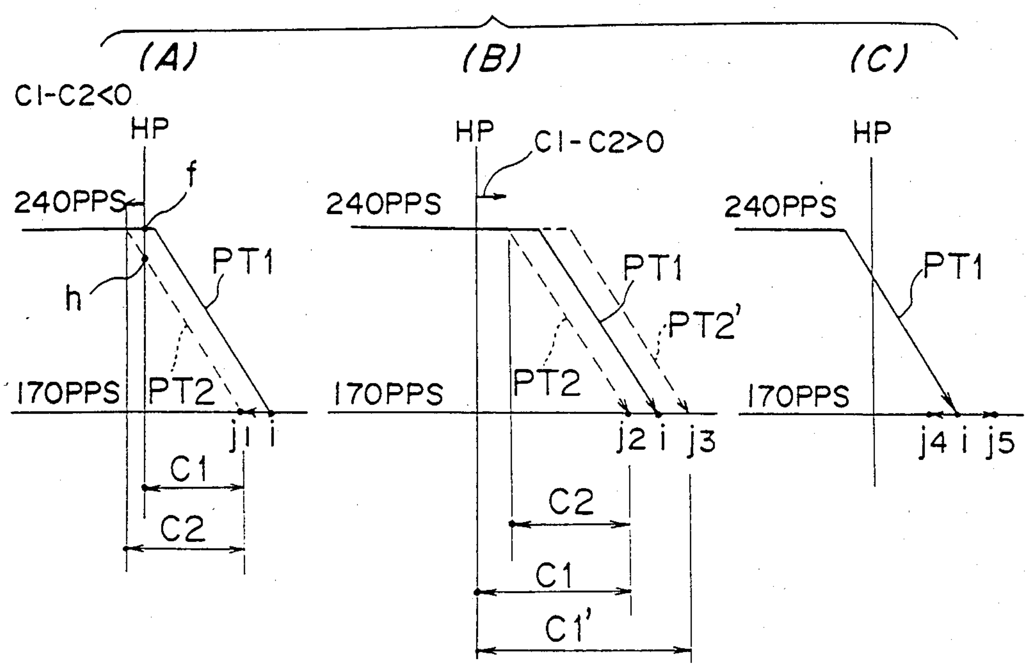
FIGS. 1(A), (B) and (C) are graphs explanatory of one example of a method of controlling a lens stop position according to the present invention.

Next, one example of a method of controlling a lens stop position according to the present invention will be described hereinbelow with reference to FIG. 1.

Now, supposing that the control pattern determined at the initial position is a speed-up (accelerating the speed)→constant speed→slow-down (decelerating the speed) pattern, and the initial position is S4 shown in FIG. 4(B), with the desired position being set at the left side of the home position HP, in this case, the moving amount of the lens is detected at the HP, namely, at the point a. When the SCPU 51 receives a lens moving command from the MCPU 50, it first determines the moving direction of the lens (rotational direction of the motor), and also the desired position, thereafter initially setting the control pattern. The initially-set control pattern is a straight pattern running from the initial point S4 to the desired position. Then, when the home position sensor detects that the lens has reached the HP, the moving amount of the lens is detected at that time. In other words, it is detected whether or not the initially-set moving distance from the initial position S4 to the home position HP is different from the distance corresponding to the actual number of pulses. If the former is different from the latter, the position of the home position HP obtained from calculation is corrected by the difference. Subsequent to this, when there is necessitated a correction in the moving amount of the lens as a result of the detecting, it is detected whether the moving condition of the lens, in accordance with the control pattern to be corrected, or the present moving condition of the lens is in, the acceleratig or decelerating condition (speed- or slow-down), or the constant speed condition. When the moving condition of the lens is the accelerating or decelerating condition, the lens is moved as it is until the speed reaches the controllable speed 170 PPS, at which point the position of the lens is corrected. On the other hand, when it is detected that the lens is in the constant speed condition, the above-described control pattern is corrected and is set again as the new control pattern, according to which the lens is moved and stopped.

FIG. 1(A) is a graph showing a method of correcting a lens position in the case where the moving condition of the lens at the HP, in accordance with the control pattern to be corrected as a result of the detecting the moving amount of the lens, is a slow-down condition.

In the drawing, PT1 represents an initial pattern set at the starting time of the movement of the lens. PT2 shows a corrected control pattern after the moving amount of the lens is detected. A point i is a desired position of the initially-set pattern, and a point j1 is a desired position after the moving amount of the lens is detected. Further, C1 corresponds to the number of pulses (corresponding to the distance) from the HP to the desired position after the moving amount is detected, while C2 corresponds to the number of pulses (corresponding to the distance) required to complete the slow-down condition. The fact that the moving condition of the lens at the HP according to the control pattern PT2 is the slow-down condition can be confirmed from an inequality $C1-C2<0$. In the case that the inequality $C1-C2<0$ is established as in the above example, in other words, the moving condition of the lens at the HP in accordance with the control pattern PT2 is the slow-down condition, the correction of the lens position after the lens has passed the HP is conducted in such a manner as follows. First, the lens is moved in accordance with the initially-set pattern PT1 to the point i at the controllable speed of 170 PPS. Then, the lens is further moved to the point j1 at the controllable speed. If the correction of the lens position is forced in accordance with the control pattern PT2 by moving the lens at the HP from the point f to the point h, there is a possibility to cause a loss of toning at the time interval in which the lens is moved from the point f to the point h. However, the possibility of the loss of toning can be completely avoided by the present embodiment according to which it is so controlled that the lens is moved first to the point i, and then to the point j1.

FIG. 1(B) is a graph showing a method of correcting a lens position when the lens is in the constant speed condition at the HP in accordance with the control pattern to be corrected as a result of the detecting of the moving amount of the lens.

Referring to the same drawing, PT2 and PT2' are respectively control patterns into which the initial control pattern PT1 needs to be corrected after the moving amount of the lens is detected. Points j2 and j3 are respective desired positions after the proofreading. Which of the two, PT2 or PT2' should be the control pattern depends on which side, right or left, C1 is positioned with respect to the i point. When the present moving condition of the lens is the constant speed condition, the fact that the moving condition of the lens at the HP in accordance with the control pattern PT2 is the constant speed condition can be confirmed by an inequality $C1-C2<0$. In the case, as above, where the inequality $C1-C2<0$ is established, with the lens being moved at constant speed at the present time, that is, the lens is moved at the constant speed at the HP in accordance with the control pattern PT2 (240 PPS), the correction of the lens position after it has passed the HP is effected in the manner that the above corrected control pattern is re-set as the control pattern to be put into practice, according to which pattern the lens is moved and stopped. As is clear from the drawing, there is no possibility of a loss of toning in this example.

FIG. 1(C) is a graph showing a method of correcting a lens position in the case that the lens is moved in the slow-down condition at the present time when a correction of the moving amount of the lens is required after the moving amount of the lens has been detected.

In the drawing, points j4 and j5 represents two desired positions after the moving amount of the lens has been detected. Depending on whether the detected amount is positive or negative, the desired position is determined to be j4 or j5. According to this example, the correction of the lens position is carried out in the manner that the lens is moved to i point in accordance with the initial pattern PT1 where the speed is the controllable speed 170 PPS, and then to j4 or j5 with the controllable speed. In this example, as in the case shown in FIG. 1(A), there is no possibility of a loss of toning without an abrupt change in the speed.

Thus, in accordance with the controlling method as described hereinabove, the lens can be stopped exactly at the desired position without a loss of toning. It is to be noted here that although the description with reference to FIG. 1 is directed to the case where the lens is controlled to be moved from the constant speed into a slow-down condition, the same method of control is performed also in the case where the moving condition of the lens is changed from the speed-up condition to the constant speed condition. More specifically, when a correction becomes necessary as a result of the detecting of the moving amount of the lens, if the control pattern to be corrected displays the accelerating or decelerating conditions at the HP, or if the present condition at the HP is the accelerating or decelerating condition, the lens position is corrected when the speed reaches the constant speed of 240 PPS or the speed becomes the controllable speed of 170 PPS. In the meantime, if the control pattern to be corrected at the HP is in the constant speed condition or the present condition at the HP is the constant speed condition, the above control pattern is corrected and is re-set as a new pattern. Then, the lens is moved and stopped in accordance with the new pattern.

Figure 6:
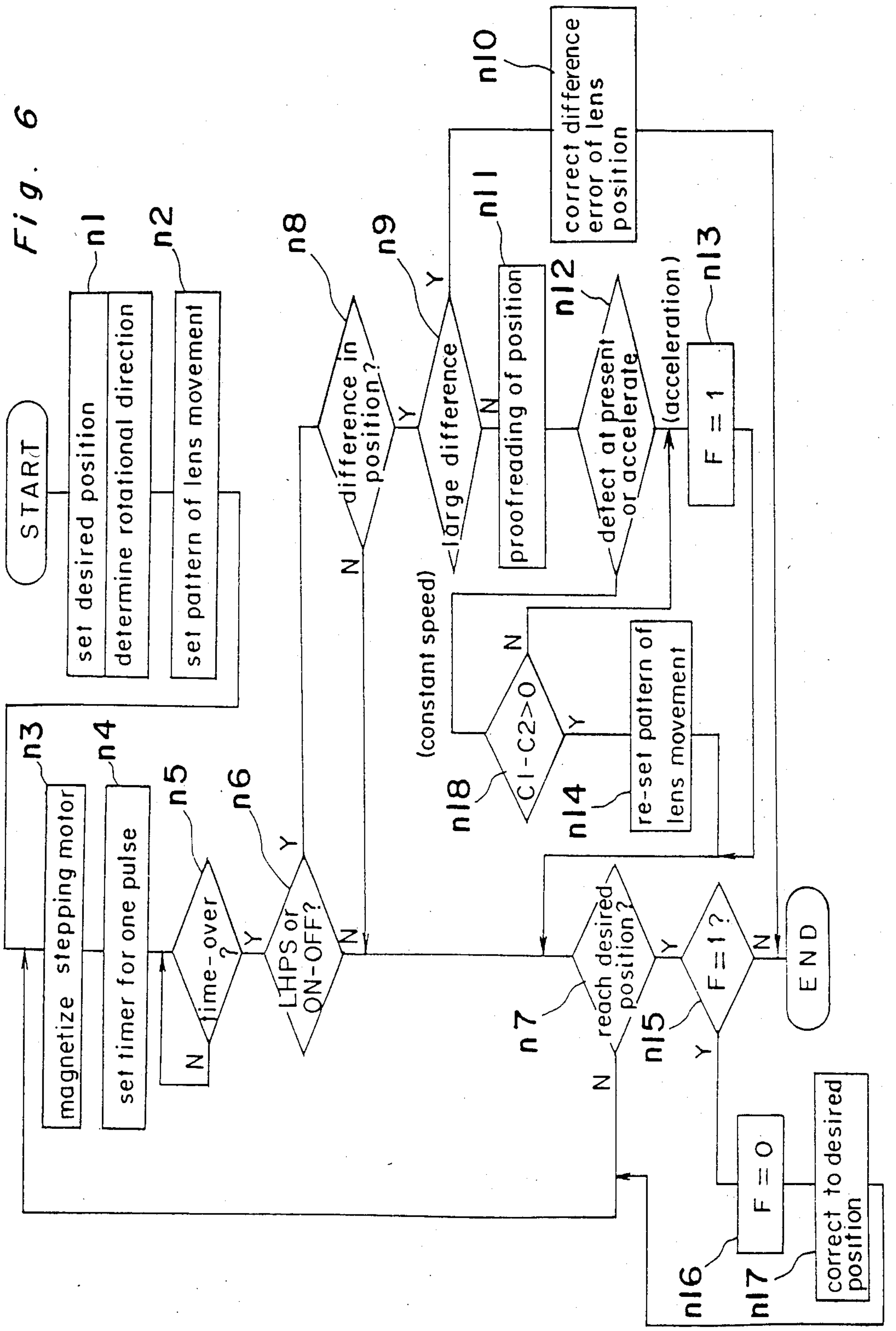
FIG. 6 is a flowchart showing the sequence of the operations of an SCPU.

FIG. 6 is a flowchart showing the sequence of operations of the SCPU 51 for practicing the above-described method of controlling the lens stop position.

First, in step n1 (hereinafter, the step n1 will be referred to only as n1), when the SCPU 51 receives a lens moving command from the MCPU 50, the SCPU 51 determines the desired position and the rotational direction, then sets a RAM area in the CPU. In n2, the SCPU 51 initially sets a control pattern for the movement of the lens. Then, in n3–n5, the control of the rotation corresponding to one pulse of the lens motor (stepping motor) 10 is carried out. This control is accomplished by the use of a timer which times every one pulse of the lens motor. It is detected in n6 whether or not the home position sensor LHPS is turned from on to off. If the sensor is not turned off, it is detected in n7 whether or not the lens has reached the desired position. It is, needless to say, the detection in n7 that is conducted with the use of the number of pulses. If the lens has not reached the desired position, the flow returns back to n3 in which the rotational control for one pulse is performed. If it is detected in n6 that the sensor output is turned from on to off, that is, if it is detected that the lens has passed the home position, the flow proceeds to n8. In n8, it is detected whether or not there is a difference in the position of the home position. Without the difference, the flow goes to n7. If there is a difference in the position of the home position, it is detected in n9 whether or not the difference is large. When it is detected in n9 that "the difference in the position of the home position is large", it corresponds to the case, for example, when substantial trouble is found in the copying apparatus itself, with approximately 10 in the number of erroneous pulses. On the other hand, when it is detected in n9 that "the positional difference is not large", it corresponds to the case, for example, when the difference is brought about by toner particles or a slight vibration. In that case, there may be several erroneous pulses. If the amount of the positional difference is over a predetermined amount, it is so judged that it is impossible to correct the difference, and the flow proceeds to n10 where an error treatment is performed to complete the operation. If the positional difference is less than the predetermined amount, the moving amount of the lens is detected in n11. It is to be noted that the detecting of the moving amount of the lens is equivalent to the detecting of the position of the home position. Thereafter, it is detected in n12 whether the present condition of the movement of the lens at the HP is the accelerating speed condition or the constant speed condition. For example, the case shown in FIG. 1(C) is in the accelerating or decelerating condition, and the cases shown in FIGS. 1(A) and (B) are in the constant speed condition. In the accelerating or decelerating condition, a flag F is set in n13, and in the constant speed condition the result of the operation C1−C2 is detected by a mark in n18. If the result is positive, the flow proceeds to n14 where the control pattern to be corrected after the proofreading is re-set as a control pattern to be actually practiced. If the result is negative, the flow goes to n13. The case where $C1-C2<0$ is established corresponds to the case shown in FIG. 1(B). The case where $C1-C2<0$ is established corresponds to the case shown in FIG. 1(A).

When it is detected in n12 that the present condition is the accelerating or decelerating condition, the flow proceeds to n13. This case corresponds to the case shown in FIG. 1(C). The flag F is set in n13. When the flow runs from n18 to n13, and from n12 to n13, the desired position is still a desired position set in accordance with the initial pattern. After completing the foregoing operation, the flow returns back to n7, carrying out again the operation in n3 and thereafter. If it is detected in n7 that the lens has reached the desired position, the flow passes to n15 where it is detected whether or not the flag F is set. If the flag F is not set, the operation is completed. If the flag is set, the flag is reset in n16, and the desired position is corrected in n17, thereafter the flow returns to n3. In the case where the flow proceeds from n7 through n15 to the end, there is no positional difference generated at all, and a new pattern for controlling the movement of the lens is set after the flow proceeds from n18 to n14. However, in the case where the flow proceeds from n15 to n16, that is the case where the flag is set 1 in n13. In the latter case, the desired position is corrected in n17, then it is detected in n7 that the lens has reached the desired position, and the operation is completed.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. In a method for controlling the movement of a lens in an electrophotographic copying apparatus wherein the lens is driven by a stepping motor which steps in response to application of a number of pulses thereto, said number of pulses applied to said motor corresponding to the movement of said lens, an improvement thereof comprising the steps of:

setting an initial control pattern for the movement of said lens to a desired position, detecting whether said lens has passed through a home position by using a sensor;

detecting the amount of movement of the lens when it is detected by the sensor that the lens has passed through said home position;

detecting whether the speed of movement of the lens at the home position is accelerating, decelerating or constant; and correcting the position of the lens to compensate for differences between said initial control pattern and the amount of movement detected such that, if it is detected that the speed of movement of said lens is accelerating or decelerating, said lens position is moved to said desired position only after the speed of movement of said lens becomes constant or controllable, but if it is detected that the speed of movement of said lens is constant, correcting the initial control pattern for the movement of said lens to move the lens to said desired position.

2. A method, as recited in claim 1, wherein said step of setting sets the initial control pattern according to a desired pattern; and said step of correcting moves said lens according to said desired pattern.

* * * * *